Aug. 18, 1931.  C. S. WEYANDT  1,819,008
METHOD OF AND APPARATUS FOR OPERATING ELECTRIC MOTORS
Original Filed Feb. 1, 1926
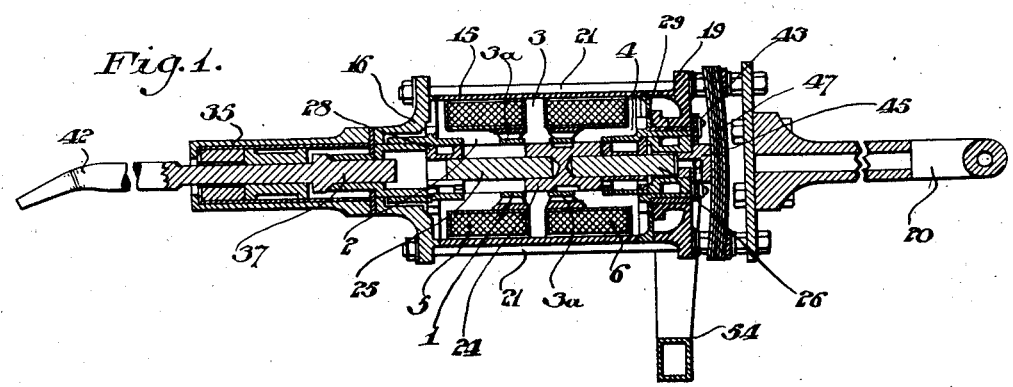
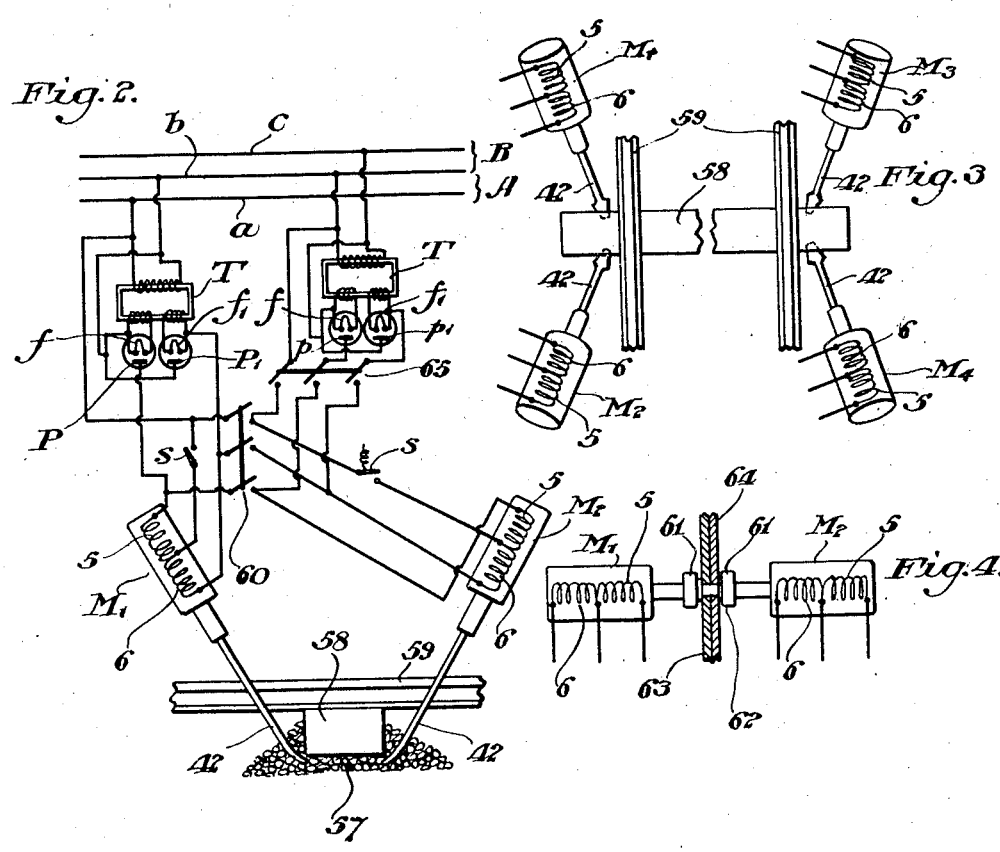
Inventor
Carl S. Weyandt
By Cornelius D. Ehret
his Attorney Patented Aug. 18, 1931

1,819,008

UNITED STATES PATENT OFFICE

CARL S. WEYANDT, OF PITTSBURGH, PENNSYLVANIA, ASSIGNOR TO CENTRAL ELECTRIC TOOL COMPANY, OF PITTSBURGH, PENNSYLVANIA, A CORPORATION OF PENNSYLVANIA

METHOD OF AND APPARATUS FOR OPERATING ELECTRIC MOTORS

Original application filed February 1, 1926, Serial No. 85,245. Divided and this application filed June 1, 1928. Serial No. 282,103.

My invention relates to a method of and apparatus for operating electric motors of the reciprocating, oscillatory or vibratory type, particularly such as are utilizable as percussive tools for drilling, cutting, chipping, riveting or otherwise working metal, stone, concrete and the like, and particularly for tamping railway ballast, or earth, as around poles or posts, or such as backfill in ditches.

Further in accordance with my invention, in riveting, tamping, and other fields of application of tools of this general character, a plurality of tools may be operated in phase from a source of alternating current, causing simultaneous impacts upon the tamping tools, rivet sets, and the like, whereby the simultaneous blows are more effective, under certain circumstances, than single blows or single blows occurring at different times.

Further in accordance with my invention, under suitable circumstances, two or more tools may be operated at the same frequency, but caused to strike the tamping bars, rivet sets or the like dis-simultaneously.

Further in accordance with my invention, I may utilize a polyphase source of alternating current and operate one or more motors from one phase and one or more motors from the other phase; and for such purpose in accordance with my invention a system is provided for transferring one or more motors from one phase to another of a polyphase source of current.

My invention further resides in a method and apparatus of the character as hereinafter described and claimed.

This application is a division from my application Serial No. 85,245 for reciprocating motor, filed February 1, 1926, patented August 14, 1928, No. 1,680,311.

Fig. 1 is a vertical sectional view, partly in elevation, of a ballast or tie tamper suitable for my system.

Fig. 2 is a diagrammatic view of circuit arrangements utilizable with a plurality of reciprocating motors for effecting blows either in or out of phase with each other.

Fig. 3 is a plan view of a railway tie with a plurality of tampers operating thereon.

Fig. 4 is a view, partly in section, illustrating the application of my invention to riveting.

Referring to Fig. 1, the ballast or tie tamper, which is specifically described and claimed in application Serial No. 85,245 above referred to, comprises an outer magnetic housing or casing 15, having end portions 16 and 19 clamped thereto by tie rods 21. Handles 20 and 54 are secured to one of said end portions, and spring buffer structure 47 for co-operating with the reciprocating core system in a manner hereinafter described, is disposed between one of said handles and its end portion.

Within the magnetic housing is supported the field producing structure, comprising separate field windings 5 and 6, and groups of laminations, 2, 3 and 4 which determine air gaps 3a in the magnetic circuits formed by the magnetic housing and laminations.

A reciprocating core system comprising a magnetizable core 24 and non-magnetic supporting guide rods 25 and 26 slidable in suitable bearings 28 and 29, is adapted to move alternately into engagement with a tool shank 37 and the aforesaid spring buffer structure under the influence of alternate magnetic impulses transmitted through the respective air gaps to the magnetizable core. The spring buffer serves not only to cushion the rearward blow of the core system, but also to restore kinetic energy absorbed thereby to the core in its initial forward or working stroke. A core-stop lubricating member 45 is disposed between the buffer and core system, and is slidable to a limited degree within lubricating bearing 43. The laminations, field coils and guide bearings are all positioned with respect to a central tubular guide member 1 within which the core system reciprocates. A suitable extension 35 supports and guides tool 42, which may be a conventional tamper or similar percussive tool.

The above description is considered adequate to cover the operation and construction of the reciprocating motors which, per se, do not constitute my present invention but relate thereto as elements of my operating system, hereinafter described.

Referring to Fig. 2, there are shown alternating current supply conductors $a$, $b$ and $c$, delivering polyphase alternating current, for example, a two phase current. The current for phase A is delivered, for example, by the conductors $a$ and $b$, and the current for the phase B is delivered by conductors $b$ and $c$. In the case of the usual two phase current, the electro-motive-force waves of the two phases are in quadrature.

Across the conductors $a$ and $b$ is connected the primary of a transformer T provided with two secondaries delivering current, respectively, to the filaments or cathodes $f$ and $f1$ of thermionic valves whose anodes or plates are indicated at $p$ and $p1$. The valves are connected, respectively, in circuit with the windings 5 and 6, whose circuits are closed upon closure of switch $s$, of a reciprocating motor M1 of an suitable structure, including the structure of the character shown in Fig. 1, and utilized for striking the tamping tool 42, which operates upon the ballast or broken stone 57 to drive it to place, and particularly to tamp it under the railway tie 58, upon which are secured the rails 59. A similar motor M2 may be thrown into parallel with the motor M1, by closure of the switch 60, either through the same valves supplying motor M1 or through a separate valve system connected to the same phase, whereby the tamping tools 42 of the two motors will be simultaneously struck by the moving systems or plungers of the two motors. This operation of the tamping or other tools 42, at the same frequency and in phase with each other, is of advantage in various relations, as in tamping, and, as indicated in Fig. 4, for riveting, where the rivet sets 61 simultaneously strike the rivet 62 for securing the plates 63 and 64 to each other.

In tamping particularly, this striking of the tamping tools at the same instants is of advantage, for the broken stone or ballast is the more readily and efficiently compacted and forced into position under a tie. This is particularly true when the two tamping bars 42 are used on opposite sides of and at the same end of a tie 58, which in Fig. 2 is shown in end view. It is understood, however, that the tamping tools may be struck at the same instants, though they may be applied in different relative positions with respect to or along the tie.

Where it is desired that the tools, such as tamping bars, rivet sets or any other type of tool in any field of application of the motors, shall be struck at different instants, the motors may be operated out of phase, so to speak, causing impacts upon their associated tools at different instants, by connecting a second motor, for example, M2, through the multiple pole switch 65 with switch 60 open with similar valve structure supplied by phase B through conductors $b$ and $c$. In this case the tools 42, for example, will be struck the same number of times per unit of time, but not at the same instants. It is obvious that suitable interconnecting means between switches 60 and 65 may be utilized if desired to prevent their simultaneous closure.

In Fig. 3 the tie 58 and rails 59 are shown in plan with the motors M1 and M2 used at one end of the tie 58, on opposite sides thereof, causing either simultaneous or dis-simultaneous actuation of the tools 42, depending upon whether the switch 60 be closed with switch 65 open, or the switch 65 closed and switch 60 open. Simultaneously, at the other end of the tie, on opposite sides thereof, there may be used tamping tools operated by the motors M3 and M4, whose tools 42 may be struck either simultaneously or at different instants.

Or two tools, driven, for example, by motors M1 and M3, on the same side of a tie, at opposite ends or at different positions longitudinally thereof, may have their tools 42 either simultaneously or dis-simultaneously struck by the motor mechanism.

Or a pair of motors M2 and M3, on opposite sides of the tie, and at different positions longitudinally thereof, may have their tools 42 either simultaneously or dis-simultaneously struck.

It will be apparent that the electromagnetic motor structure may take different form than herein illustrated. For example, the movable core or armature member may partake of movement about a pivotal position in response to energization of field-producing structure, instead of guided rectilinear alternate movement herein described. Furthermore, it is not essential that the armature member move freely to effect impact or percussion. For example, the said armature may have a member secured thereto, as a screen, so that said member acts as a continuous load upon the armature.

For the purpose of brevity in the appended claims, the term "reciprocating" is intended to include broadly alternate motion between two limits, and is not limited to alternate rectilinear motion, or to free alternate motion as contrasted with alternating motion wherein a restraining force continually manifests itself.

What I claim is:

1. The combination with a polyphase source of current, of a plurality of reciprocating motors each comprising a reciprocating core system and electro-magnetic actuating means therefor, and switching mechanism for bringing the electro-magnetic actuating means of said motors into common association either with one phase or different phases of said source.

2. The combination with a polyphase source of current, of a plurality of reciprocating motors, each comprising a reciprocating core system and electro-magnetic actuating means therefor, and switching mechanism for bringing the electro-magnetic actuating means of each of said motors either into parallel relation with each other for energization from one phase, or into independent association with different phases of said polyphase source of current.

3. The combination with a polyphase source of current, of a plurality of reciprocating motors, each comprising a reciprocating core system and electro-magnetic actuating means therefor, and switching mechanism for bringing corresponding electro-magnetic actuating means of each of said motors either into parallel relation with each other for energization from one phase to cause their respective reciprocating core systems to move in phase with each other, or into independent association with different phases of said polyphase source of current to cause said core systems to reciprocate at the same frequency and to deliver blows dis-simultaneously.

4. The combination with sources of current delivering fluctuating or alternating currents of the same frequency but differing in phase, of a plurality of recipocating motors, each comprising a reciprocating core system and electro-magnetic means for actuating it, asymmetrical conductors connected between the respective sources of alternating current and individual motors, and means for relating the respective electro-magnetic means with their corresponding asymmetrical conductors for causing said core systems to reciprocate at the same frequency and to deliver blows dis-simultaneously.

5. A system comprising a source of alternating current, a plurality of reciprocating motors each comprising a reciprocating armature system and electro-magnetic actuating means therefor, and switching mechanism for connecting the electro-magnetic actuating means of said motors to said source and selectively operable to effect movement of their armature systems out of phase with each other or in phase with each other.

6. A system comprising a source of alternating current, at least two rectifiers, a plurality of reciprocating motors each comprising a reciprocating armature system and electro-magnetic actuating means therefor, and switching mechanism selectively operable to connect the electro-magnetic actuating means of at least one of said motors to one or another of said rectifiers to effect a desired phase relation of the movements of the armature systems of said motors.

CARL S. WEYANDT.